United States Patent [19]

Da Re'

[11] Patent Number: 5,059,361

[45] Date of Patent: Oct. 22, 1991

[54] METHOD FOR THE PRODUCTION OF STRUCTURAL ELEMENTS OF THERMOSETTING PLASTICS MATERIAL, PARTICULARLY COMPONENT PARTS FOR MOTOR VEHICLE BODIES, BY INJECTION MOULDING

[75] Inventor: Mario Da Re', Turin, Italy

[73] Assignee: Fiat Auto S.p.A., Turin, Italy

[21] Appl. No.: 252,072

[22] Filed: Sep. 30, 1988

[30] Foreign Application Priority Data

Sep. 30, 1987 [IT] Italy .................................. 67830 A/87

[51] Int. Cl.$^5$ .............................................. B29C 67/22
[52] U.S. Cl. .................................... 264/25; 264/45.1; 264/255; 264/328.6; 264/328.18
[58] Field of Search ............. 264/25, 45.1, 255, 328.2, 264/328.18, 328.6; 425/174

[56] References Cited

U.S. PATENT DOCUMENTS

| | | | |
|---|---|---|---|
| 2,537,182 | 1/1951 | Bertrand | 425/17 |
| 3,789,103 | 1/1974 | Sueyoshi et al. | 264/328.2 |
| 3,873,656 | 3/1975 | Garner | 264/45.1 |
| 3,918,863 | 11/1975 | Rhodes, Jr. | 425/117 |
| 4,014,966 | 3/1977 | Hanning | 264/45.1 |
| 4,539,166 | 9/1985 | Richartz et al. | 264/45.1 |
| 4,714,575 | 12/1987 | Preston | 264/DIG. 83 |

FOREIGN PATENT DOCUMENTS

| | | | |
|---|---|---|---|
| 56-030172 | 7/1981 | Japan . | |
| 1406229 | 9/1975 | United Kingdom | 264/255 |

*Primary Examiner*—Robert A. Dawson
*Assistant Examiner*—Robert A. Kuhns
*Attorney, Agent, or Firm*—Sughrue, Mion, Zinn, Macpeak & Seas

[57] ABSTRACT

Structural elements of thermosetting plastics material, particularly component parts for motor vehicle bodies, are produced by injecting into a mould, in accordance with known "sandwich" injection moulding technology, a first flow of thermosetting plastics material which, after its polymerization in the mould, has aesthetic characteristics and characteristics of flexibility and impact strength, and subsequently a second flow of thermosetting plastics material which, after polymerization has characteristics of rigidy and structural strength, so as to obtain structural elements which have a rigid core of the second material and a shell of the first material adhering to the core.

5 Claims, No Drawings

METHOD FOR THE PRODUCTION OF STRUCTURAL ELEMENTS OF THERMOSETTING PLASTICS MATERIAL, PARTICULARLY COMPONENT PARTS FOR MOTOR VEHICLE BODIES, BY INJECTION MOULDING

The present invention relates to a method for the production of structural elements of thermosetting plastics material, particularly component parts for motor vehicle bodies, by moulding.

The production of structural elements of thermosetting material, particularly of reinforced unsaturated polyesters, such as SMC and BMC, is currently carried out by means of direct compression moulding, injection-compression or injection, with results which, for the most part, are acceptable. However, an objective which is still to be attained is a compromise between the requirements concerning the impact strength values, the rigidity and the aesthetic aspect of the structural element thus obtained. Very often, in order to satisfy one of these requirements, it is necessary to sacrifice the others, even if only partially, with the result that the opportunities for use are sometimes limited.

In fact, when material formulations with high impact strength characteristics are used, the material may be too flexible, whereby it is necessary to produce ribs which can give rise to shrinkage that is not acceptable from the aesthetic point of view. When it is wished to produce structural parts of plastics material suitable for replacing corresponding metal parts, such as, for example, body panels, it is generally necessary to use plastic materials with a high modulus of elasticity. The result is that weakness occurs, especially at the corners and along the edges.

The aesthetics of the surfaces can be pursued with the use of additives for reducing shrinkage, to the detriment, however, of other properties, such as, for example, excessive deflection in the case of associated thermal and mechanical loads.

The object of the present invention is to provide a method which enables structural elements combining the aforesaid desired characteristics of rigidity, strength and aesthetics, to be obtained by means of moulding.

For this purpose, the subject of the invention is a method characterised in that it includes the operations of injecting into the mould in succession, in accordance with the known "sandwich" injection moulding method, a first flow of thermosetting plastics material which, after its polymerisation, has aesthetic characteristics and characteristics of flexibility and impact strength, and a second flow of thermosetting plastics material which, after polymerisation, has characteristics of rigidity and structural strength, so as to produce a moulded structural element which has a rigid core of the second material and a resilient shell of the first material adhering to the core.

The materials constituting the core and the shell may both be constituted by fibre-reinforced unsaturated polyester resin, for example BMC, the material intended to constitute the shell having a lower percentage concentration of fibre than that of the material constituting the core. The material constituting the shell preferably includes short fibres generally having a length of between 5 and 10 mm, in a concentration of between 5 and 10% by weight. It may also be convenient to include in the material forming the shell elastomeric thermoplastic materials of the polyester, elastomeric-thermoplastic-polyurethane, and thermoplastic-rubber type, possibly in combination with melamine.

The material forming the core may be constituted by reinforced unsaturated polyester resin (BMC) having a percentage of glass fibre of the order of 40 to 60% by weight. This material generally has a percentage of fillers, including fibre and organic fillers, such as, for example, melaminised wood, and conductive fillers, which is greater than the concentration of fillers in the material constituting the shell. In this case, expanding agents and thermoplastic resins may also be introduced into the material constituting the core.

According to another embodiment, the material forming the core is constituted by a polyurethane including expanding agents which enable a rigid core of expanded material to be obtained, and the shell and the core can both include an expanding agent.

The main problem connected with the application of the "sandwhich" technique to the moulding of thermosetting materials lies in the difficulty of obtaining correct polymerisation of the material constituting the core inside the mould, due to the thermally insulating action of the previously injected material constituting the shell.

The method according to the invention resolves this problem by subjecting the flow of material constituting the core to pre-heating by means of the application of a high-frequency load immediately before injection or ramming, so as to bring the material to a temperature close to the polymerisation temperature before its injection into the mould. Alternatively, the problem may be resolved by using a polyurethane injected by the RIM technique as the core material and by making use of the heat generated by the reaction between the isocyanate and the polyol directly in the mould.

The apparatus for carrying out the method does not differ substantially from that used in the "sandwich" moulding technique used for thermoplastic materials. This apparatus comprises a horizontal or vertical press provided with two injection or ramming units adapted for introducing the two materials into the mould in rapid succession, so that the material having aesthetic characteristics, which constitutes the shell, is on the outside and the rigid material constituting the core is on the inside. The flow of the two materials from the injection-ramming unit to the mould is interrupted by a nozzle of known type used for "sandwich" moulding of thermoplastic materials.

I claim:

1. A method for the production of structural elements of thermosetting plastic materials, particularly component parts for motor vehicle bodies, by moulding, which comprises the steps of:

preheating by applying a high frequency load immediately before injection moulding a first flow of thermosetting plastic material which, after its polymerization, has aesthetic characteristics and characteristics of flexibility and impact strength;

preheating, before injection moulding, a second flow of thermosetting plastic material which, after polymerization, has characteristics of rigidity and structural strength; and injecting into the mould in succession said first preheated flow of thermosetting plastic material and said second preheated flow of thermosetting plastic material to form a rigid core of said second flow of thermosetting plastic material having a resilient shell of the first flow of thermosetting plastic material adhered thereto, said shell being formed prior to said core, wherein the material of the first flow of thermosetting plastic material is a fiber-reinforced unsaturated polyester resin (BMC) and wherein the material of said second flow of thermosetting plastic material is selected from the group consisting of a fiber-reinforced unsaturated polyester resin and a polyurethane, wherein said first flow of thermosetting plastic material and said second flow of thermoplastic material are both foamed.

2. A method according to claim 1, wherein the material of the first flow of thermosetting plastic material includes elastomeric-thermoplastic materials in combination with melamine.

3. A method according to claim 1, wherein said second flow of thermosetting plastic material is preheated by means of the application of a high-frequency load thereto immediately before moulding.

4. A method according to claim 3, wherein said second flow of thermosetting plastic material is said polyurethane.

5. A method for the production of structural elements of thermosetting plastic materials, particularly component parts for motor vehicle bodies, by moulding, which comprises the steps of:

preheating by applying a high frequency load immediately before injection moulding a first flow of thermosetting plastic material which, after its polymerization, has aesthetic characteristics and characteristics of flexibility and impact strength;

injection moulding a second flow of thermosetting plastic material which, after polymerization, has characteristics of rigidity and structural strength; and injecting into the mould in succession said first preheated flow of thermosetting plastic material and said second preheated flow of thermosetting plastic material to form a rigid core of said second flow of thermosetting plastic material having a resilient shell of the first flow of thermosetting plastic material adhered thereto, said shell being formed prior to said core, wherein the material of the first flow of thermosetting plastic material is a fiber-reinforced unsaturated polyester resin (BMC) and wherein the material of said second flow of thermosetting plastic material is selected from the group consisting of a fiber-reinforced unsaturated polyester resin and a polyurethane, wherein said first flow of thermosetting plastic material and said second flow of thermoplastic material are both foamed, wherein said second flow of thermosetting plastic material is said polyurethane and wherein said polyurethane is injected by the RIM technique, whereby heat is generated by reaction between the isocyanate and polyol comprising the polyurethane directly in the mould.

* * * * *